US007920850B1

(12) United States Patent  (10) Patent No.: US 7,920,850 B1
Harris et al.  (45) Date of Patent: Apr. 5, 2011

(54) METHOD AND SYSTEM FOR A HOSPITALITY ENTITY TO COMMUNICATE GOODS AND SERVICES TO A GUEST

(75) Inventors: Shawn Dirk Harris, Las Vegas, NV (US); Juan Manuel Cerna, Henderson, NV (US)

(73) Assignee: SkyWire Media, Inc., Las Vegas, NV (US)

( * ) Notice: Subject to any disclaimer, the term of this patent is extended or adjusted under 35 U.S.C. 154(b) by 0 days.

(21) Appl. No.: 12/902,128

(22) Filed: Oct. 11, 2010

Related U.S. Application Data

(60) Provisional application No. 61/384,734, filed on Sep. 21, 2010.

(51) Int. Cl.
*H04M 3/42* (2006.01)
*H04W 4/00* (2009.01)
*H06Q 30/00* (2006.01)

(52) U.S. Cl. .................. 455/414.1; 455/466; 705/14.34; 705/14.64

(58) Field of Classification Search .................. 455/466, 455/414.1, 414.2, 414.3; 705/14.1, 14.11, 705/14.26, 14.34, 14.37, 14.38, 14.4, 14.43, 705/14.47, 14.49, 14.5, 14.57, 14.58, 14.61, 705/14.64, 14.65, 14.66, 14.67
See application file for complete search history.

(56) References Cited

U.S. PATENT DOCUMENTS

| | | | | |
|---|---|---|---|---|
| 7,257,392 | B2 * | 8/2007 | Tang et al. | 455/414.2 |
| 7,577,620 | B1 * | 8/2009 | Donner | 705/67 |
| 7,611,411 | B2 | 11/2009 | Griswold et al. | |
| 7,881,702 | B2 * | 2/2011 | Heyworth et al. | 455/414.1 |
| 2002/0049535 | A1 * | 4/2002 | Rigo et al. | 701/211 |
| 2002/0095312 | A1 * | 7/2002 | Wheat | 705/1 |
| 2003/0216960 | A1 * | 11/2003 | Postrel | 705/14 |
| 2005/0004840 | A1 * | 1/2005 | Wanninger | 705/14 |
| 2005/0125831 | A1 * | 6/2005 | Blanchard | 725/81 |
| 2006/0234631 | A1 * | 10/2006 | Dieguez | 455/41.2 |
| 2007/0055565 | A1 * | 3/2007 | Baur et al. | 705/14 |
| 2007/0173266 | A1 * | 7/2007 | Barnes, Jr. | 455/456.1 |
| 2007/0214052 | A1 | 9/2007 | Kao | |
| 2007/0265911 | A1 * | 11/2007 | Rondeau | 705/14 |
| 2008/0147461 | A1 * | 6/2008 | Lee et al. | 705/7 |
| 2008/0160956 | A1 * | 7/2008 | Jackson et al. | 455/406 |
| 2008/0167959 | A1 * | 7/2008 | Lovell | 705/14 |
| 2008/0214216 | A1 * | 9/2008 | Bragg et al. | 455/466 |
| 2008/0270230 | A1 * | 10/2008 | Hendrickson et al. | 705/14 |
| 2008/0306826 | A1 * | 12/2008 | Kramer et al. | 705/14 |
| 2009/0076912 | A1 * | 3/2009 | Rajan et al. | 705/14 |
| 2009/0171559 | A1 * | 7/2009 | Lehtiniemi et al. | 701/201 |
| 2009/0172035 | A1 * | 7/2009 | Lessing et al. | 707/104.1 |
| 2009/0298481 | A1 * | 12/2009 | Hurst | 455/414.1 |

(Continued)

FOREIGN PATENT DOCUMENTS

WO WO02/058304 7/2002

(Continued)

*Primary Examiner* — Christopher M Brandt
(74) *Attorney, Agent, or Firm* — Clause Eight IPS; Michael Catania

(57) ABSTRACT

A system and method for a hospitality entity to communicate goods and services to a guest based on events occurring at a facility of the hospitality entity is disclosed herein. The method includes establishing a unique identifier with a mobile phone of a guest and then sending executable offers to the guest which upon acceptance triggers another offer based on the first offer acceptance and events occurring at the time and location of the guest.

4 Claims, 9 Drawing Sheets

U.S. PATENT DOCUMENTS

| | | | |
|---|---|---|---|
| 2009/0313062 A1* | 12/2009 | Natsuyama et al. | 705/7 |
| 2010/0030592 A1* | 2/2010 | Evans et al. | 705/5 |
| 2010/0100431 A1* | 4/2010 | Vicens et al. | 705/14.12 |
| 2010/0124937 A1* | 5/2010 | Vogel et al. | 455/466 |
| 2010/0205036 A1* | 8/2010 | Van Der Haar et al. | 705/10 |
| 2010/0217660 A1* | 8/2010 | Biswas | 705/14.38 |
| 2010/0223135 A1* | 9/2010 | Griffin et al. | 705/14.58 |
| 2010/0306060 A1* | 12/2010 | Yancey et al. | 705/14.64 |
| 2010/0318407 A1* | 12/2010 | Leff et al. | 705/10 |
| 2010/0332315 A1* | 12/2010 | Kamar et al. | 705/14.46 |
| 2011/0022405 A1* | 1/2011 | Heinz et al. | 705/1.1 |
| 2011/0029362 A1* | 2/2011 | Roeding et al. | 705/14.13 |

FOREIGN PATENT DOCUMENTS

| | | |
|---|---|---|
| WO | WO2010/018472 | 2/2010 |

\* cited by examiner

METHOD AND SYSTEM FOR A HOSPITALITY ENTITY TO COMMUNICATE GOODS AND SERVICES TO A GUEST

CROSS REFERENCE TO RELATED APPLICATION

Statement Regarding Federally Sponsored Research or Development

Not Applicable

BACKGROUND OF THE INVENTION

1. Field of the Invention

The present invention generally relates to providing services and goods to a guest at a resort. More specifically, the present invention relates to a system and method for a hospitality entity to communicate goods and services to a guest based on events occurring at a facility of the hospitality entity.

2. Description of the Related Art

The prior art discusses various methods and systems for communicating with guests at a resort.

Buzzcity PTE, PCT Publication Number WO2002058304, for a *Wireless Messaging System and Method* discloses using SMS messages to communicate upcoming events to users.

Talisma Corporation, PCT Publication Number WO2010018472, for *A Method To Drive A Campaign Workflow Based On A Short Message Service Message Response* discloses generating and sending appropriate messages based on users responses to a marketing campaign.

However, the prior fails to provide a method and system that avoids fraud by a consumer and properly tracks the behavior of the guest to provide the most appropriate service or good in real-time.

BRIEF SUMMARY OF THE INVENTION

The present invention provides a novel and unique solution to the problems of the prior art.

One aspect of the present invention is a method for a hospitality entity to communicate goods and services to a guest based on events occurring at a facility of the hospitality entity. The method begins with receiving from a guest an opt-in decision to participate in a program of the hospitality entity that offers goods and services to the guest through SMS texts transmitted to a mobile phone of the guest. The method also includes associating a unique identifier with the mobile phone of the guest, the unique identifier comprising a plurality of alpha-numeric characters. The method also includes recognizing a first event, the first event comprising an action performed by the guest. The method also includes transmitting a first executable offer to the mobile phone through a first SMS text sent to the mobile phone, the first executable offer comprising at least a good or service provided by the hospitality entity, the first SMS text comprising the unique identifier. The method also includes determining that the first executable offer has been accepted by the guest by recognizing the unique identifier prior to conveyance of the good or service of the first executable offer to the guest, the acceptance of the first executable offer representing a second event. The method also includes transmitting a second executable offer to the mobile phone through a second SMS text sent to the mobile phone, the second SMS text comprising the unique identifier, the second executable offer transmitted subsequent to a time period associated with the second event, a content of the second executable offer based on at least the acceptance of the first executable offer and at least one of a time of day, a current date, a current local climate, a current entertainment event, and a current activity of the guest.

Preferably, the first event is checking-in at the facility of the hospitality entity. Preferably, the first executable offer is a coupon for a discount at a restaurant located on the facility of the hospitality entity. Preferably, the current entertainment event is a concert being held at the facility of the hospitality entity in the near future and the second executable offer is a free ticket to the concert. Preferably, the third event is a time delay in being seated at a restaurant located on the facility of the hospitality entity, and the third executable offer is a coupon for a free drink at a bar located in proximity to the restaurant.

In another aspect of the present invention, the original guest 100 can forward an offer to a predetermined number of other mobile phones for use of the offer by others. To prevent fraud, the unique identifier of the original guest is transmitted with the forwarded SMS messages. Alternatively, each of the forwarded messages receive a new unique identifier code.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
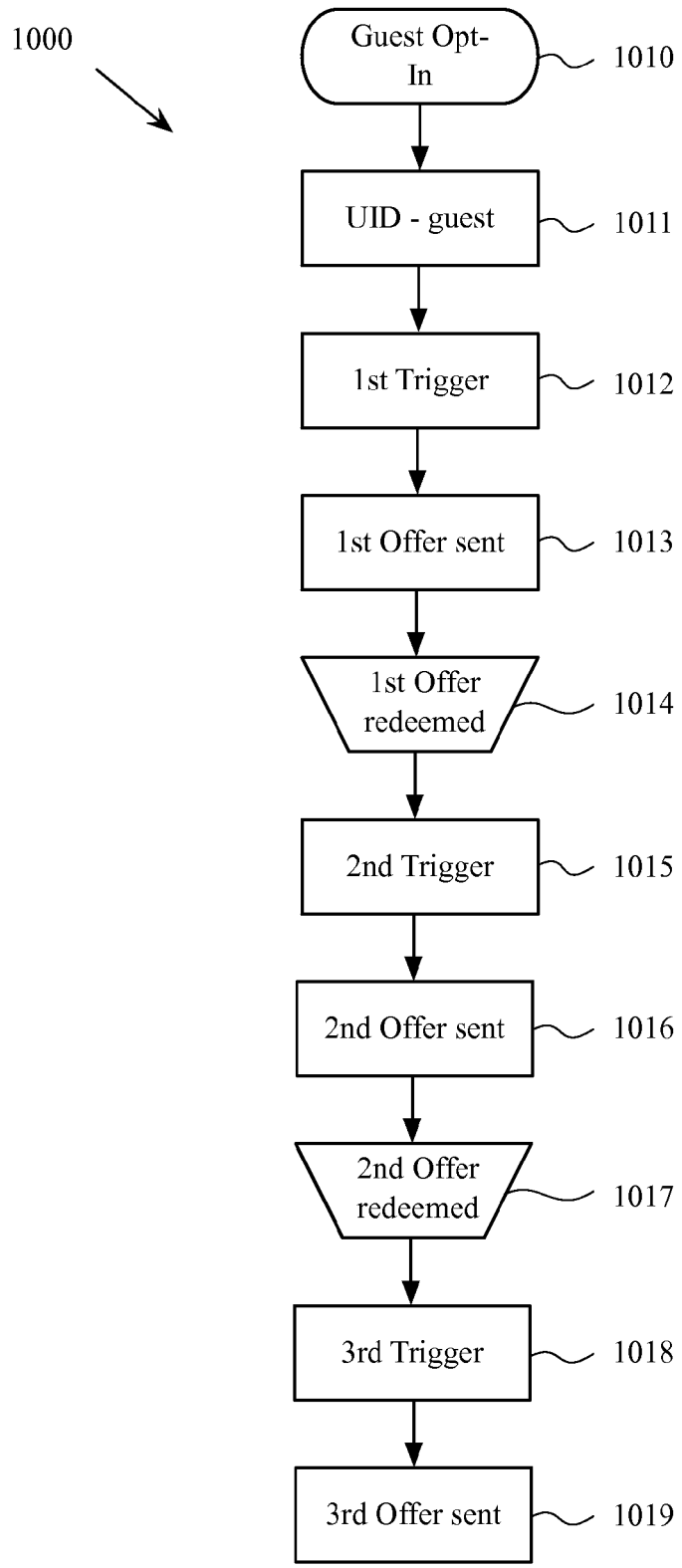
FIG. 1 is a flow chart of a general method of the present invention.
Figure 4:
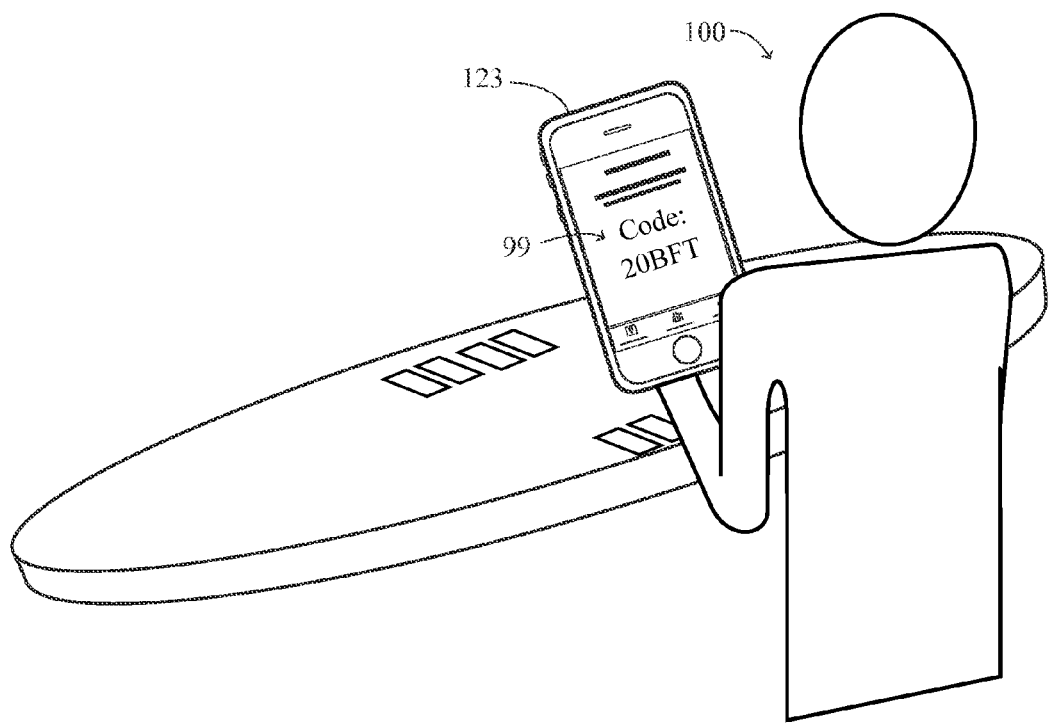
FIG. 4 is an isolated view of a guest with a mobile device having a guest user code on a display of the mobile device.

A method 1000 for a hospitality entity to communicate goods and services to a guest based on events occurring at a facility of the hospitality entity is shown in FIG. 1. At block 1010, the method begins with receiving from a guest an opt-in decision to participate in a program of the hospitality entity that offers goods and services to the guest through SMS texts transmitted to a mobile phone or other type of communication device of the guest. By opting in, the guest is making an affirmative decision to receive the SMS texts from the hospitality entity. Most mobile phone carriers (VERIZON, AT&T, SPRINT and the like) require MOBILE OPT-IN for all short code messaging campaigns. The same mobile phone carriers require support of QUIT, STOP and END as standard opt-out keywords for all short code messaging campaigns. At block 1020, a unique identifier is associated with the mobile phone of the guest. The unique identifier preferably comprises a plurality of alpha-numeric characters, such as 20BFT as shown in FIG. 4. The unique identifier is indirectly associated with the guest through the association with the mobile phone of the guest. In this manner, fraud against the hospitality entity is prevented since the unique identifier must be verified to accept the multiple offers from the hospitality entity. At block 1030, a first event is recognized by the system. The first event preferably comprises an action performed by the guest. The first event is typically the guest arriving at the hospitality entity, checking-into a room, requesting a service from a concierge.

At block 1040, a first executable offer is transmitted to the mobile phone through a first SMS text sent to the mobile phone. The first executable offer comprises at least a good or service provided by the hospitality entity. The first SMS text also comprises the unique identifier in order to verify that the offer is used only by the guest. At block 1050, the first executable offer is redeemed by the guest. The redemption of the first executable offer is accepted by the guest by a provider of the goods or services recognizing the unique identifier prior to conveyance of the good or service of the first executable offer to the guest. For example, if the first executable offer is a coupon for a discount at a restaurant located on the facility of the hospitality entity, then the hostess of the restaurant is the provider of the goods or services and the hostess inputs the unique identifier into a user interface of the system to verify that this coupon is valid and redeemable. However, those skilled in the pertinent art will recognize that the first executable offer can be any number of goods or services depending on the guest.

At block 1060, the acceptance of the first executable offer represents a second event that is triggered on the system for this particular guest. At block 1070, a second executable offer is transmitted to the mobile phone through a second SMS text sent to the mobile phone. Again, the second SMS text comprises the unique identifier to prevent fraud. The second executable offer is transmitted subsequent to a time period associated with the second event. A content of the second executable offer is based on at least the acceptance of the first executable offer and at least one of a time of day, a current date, a current local climate, a current entertainment event, and a current activity of the guest. Preferably, the current entertainment event is a concert being held at the facility of the hospitality entity in the near future and the second executable offer is a free ticket to the concert. At block 1080, the second executable offer is redeemed by the guest. The redemption of the second executable offer is accepted by the guest by a provider of the goods or services recognizing the unique identifier prior to conveyance of the good or service of the second executable offer to the guest. For example, if the second executable offer is tickets to a concert, an employee at a ticket booth is the provider of the good or service, and this employee verifies the offer by verifying the unique identifier.

At block 1090, the acceptance of the second executable offer represents a third event that is triggered on the system for this particular guest. At block 1100, a third executable offer is transmitted to the mobile phone through a third SMS text sent to the mobile phone. Those skilled in the art will recognize that as events are triggered, offers are transmitted to the guest.

Figure 5:
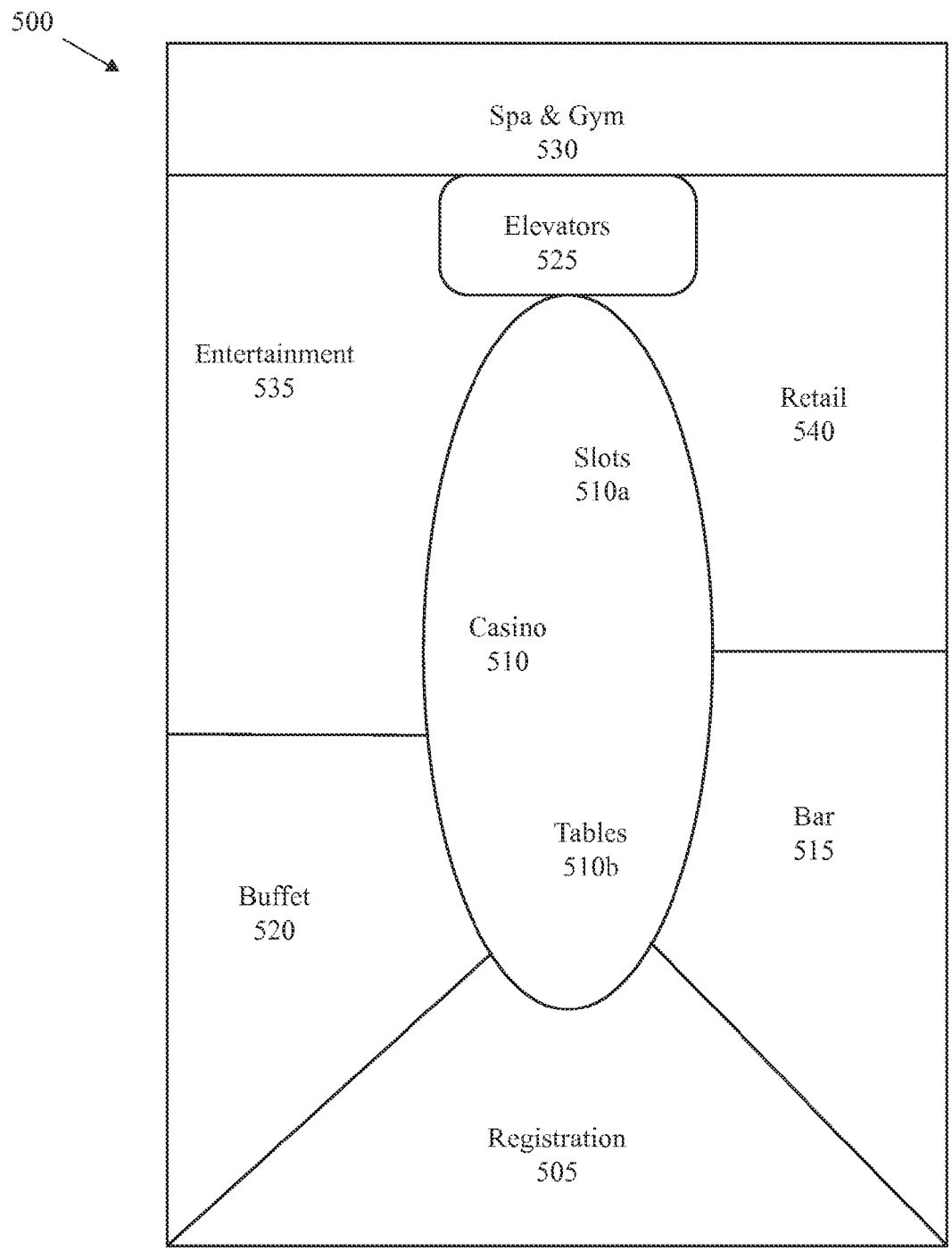
FIG. 5 is a floor plan of a resort utilized with the present invention.

A floor-plan of a hospitality entity 500 is shown in FIG. 5. The hospitality entity 500 preferably has a registration 505, a casino 510 with a slots section 510*a* and table section 510*b*, a bar 515, a buffet 520, elevators to rooms 525, a gym 530, an entertainment section 535 and a retail section 540. Those skilled in the pertinent art will recognize that the hospitality entity 500 can have different sections, more sections, less sections or duplicate sections without departing from the scope and spirit of the present invention.

Figure 3:
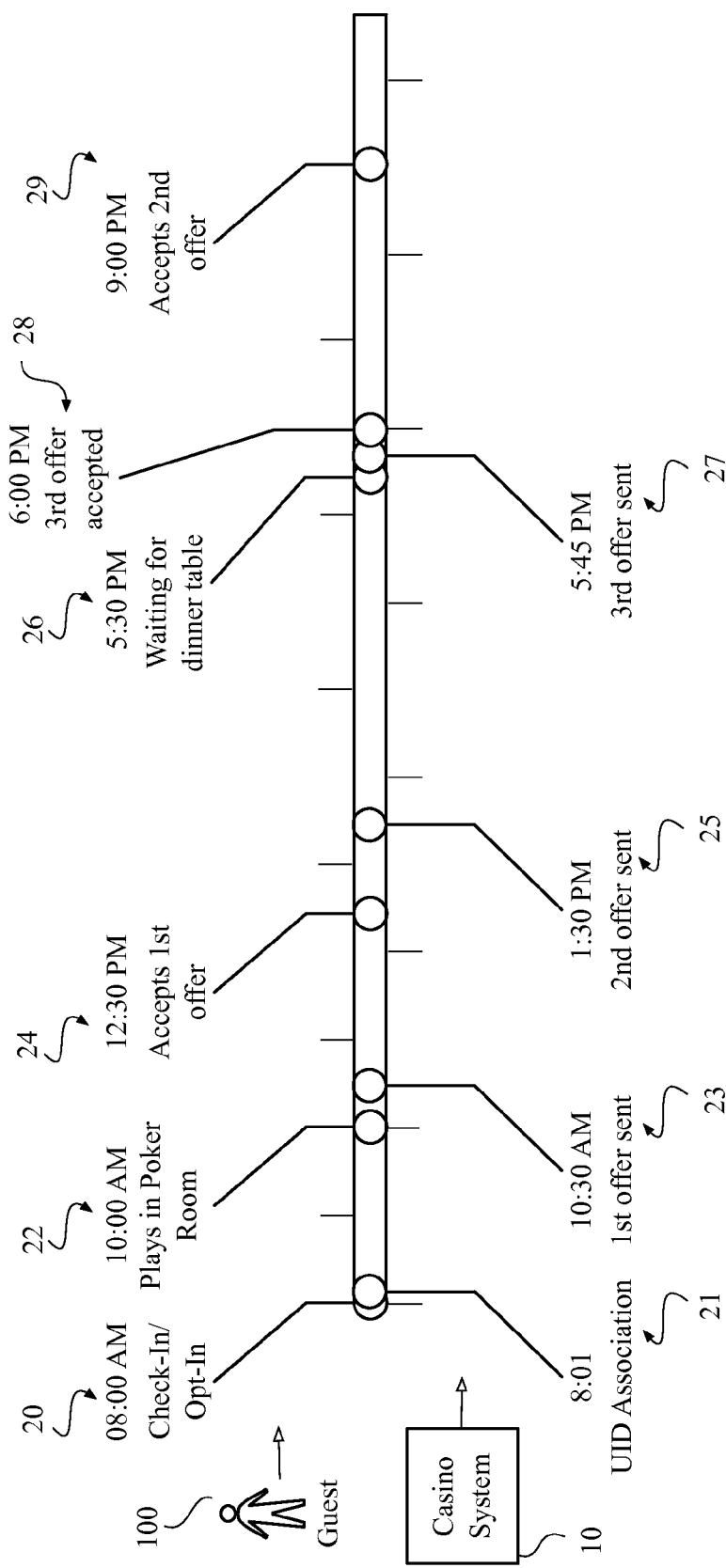
FIG. 3 is a timeline of an exemplary guest at a resort interacting with the present invention.

FIG. 3 is a timeline of a guest 100 at the hospitality entity which uses a system 10 for a hospitality entity to communicate goods and services to a guest based on events occurring at a facility of the hospitality entity. At time 20, the guest 100 checks in at 8:00 am and opts in to the system 10. At time 21, 8:01 am, a unique identifier is associated with a mobile phone of the guest 100. More specifically, the unique identifier is associated with the telephone number (e.g. 760-555-5555) for the mobile phone of the guest. As shown in FIG. 4, the guest 100 has a mobile phone 123 with the unique identifier 99 sent as a SMS message. Referring again to FIG. 3, at time 22, 10:00 am, the guest 100 plays poker in a table section 510*b* of the hospitality entity 500. At time 23, 10:30 am, a first executable offer is sent to the guest 100 as a SMS text containing the unique identifier. At time 24, 12:30 pm, the guest 100 accepts the first executable offer which is verified with the unique identifier. At time 25, 1:30 pm, a second executable offer is sent as a SMS text to the guest 100 containing the unique identifier. At time 26, 5:30 pm, the guest is waiting for a dinner table. At time 27, 5:45 pm, the hospitality entity realizes that the guest 100 is waiting and transmits a third executable offer which is an offer for free drinks at the bar while the guest waits for his or her dinner reservation. At time 28, 6:00 pm, the guest accepts the third offer by using his mobile phone to accept the free drinks at the bar, and the bartender verifies the offer for the free drinks by checking the unique identifier for the mobile phone of the guest 100. At time 29, the guest 100 accepts the second offer, which is concert tickets, by showing the offer to an employee at a ticket booth for the concert, and the employee verifies the second offer by confirming the unique identifier for the mobile phone of the guest 100.

Figure 2:
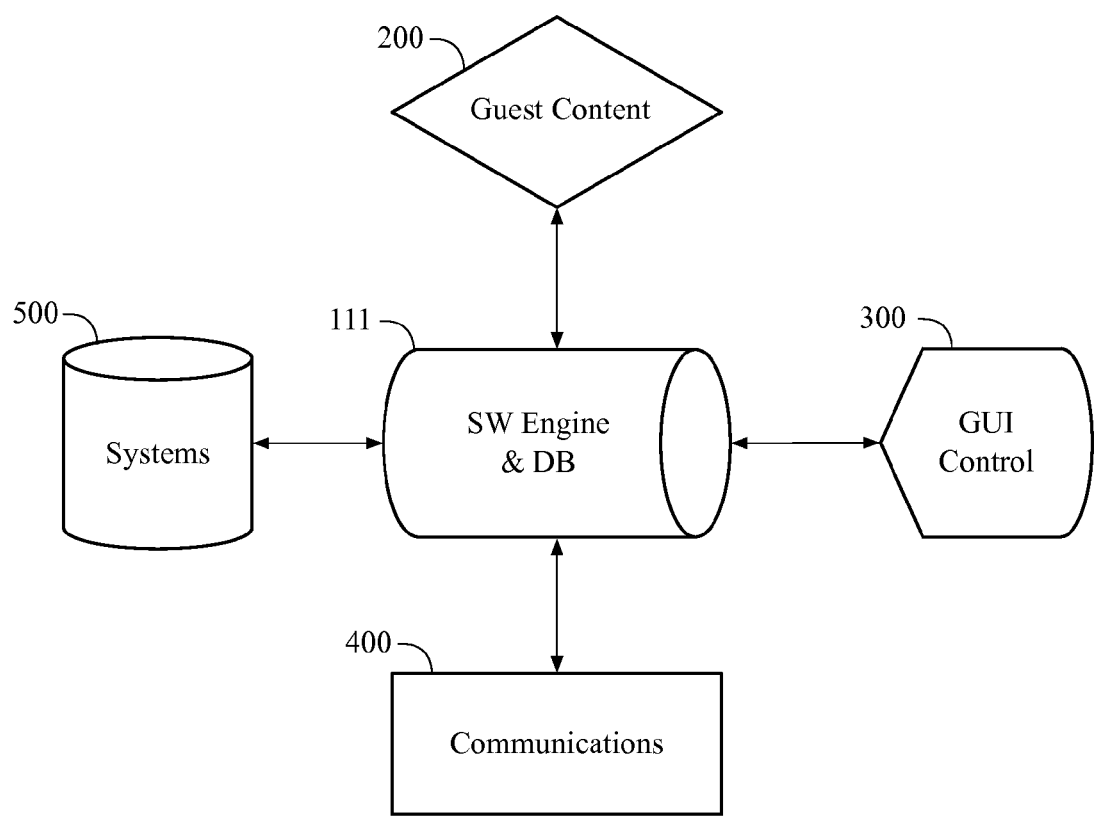
FIG. 2 is a block diagram of the overall system.

As shown in FIG. 2, a software engine and database is designated 111. The software engine and database 111 is an interactive software application, relation database, $3^{rd}$ party system integrator and communications hub. The software engine and database 111 stores all opt-in and opt-out values along with the data associated with each guest. A graphical user interface control 300 allows an operator to interact with the software engine and database 111. The software engine and database 111 sends and receives data for the guest content 200. The software engine and database 111 sends and receives data through various communication devices of the guests. The software engine and database 111 sends and receives data from the other systems of the hospitality entity 500.

Figure 2A:
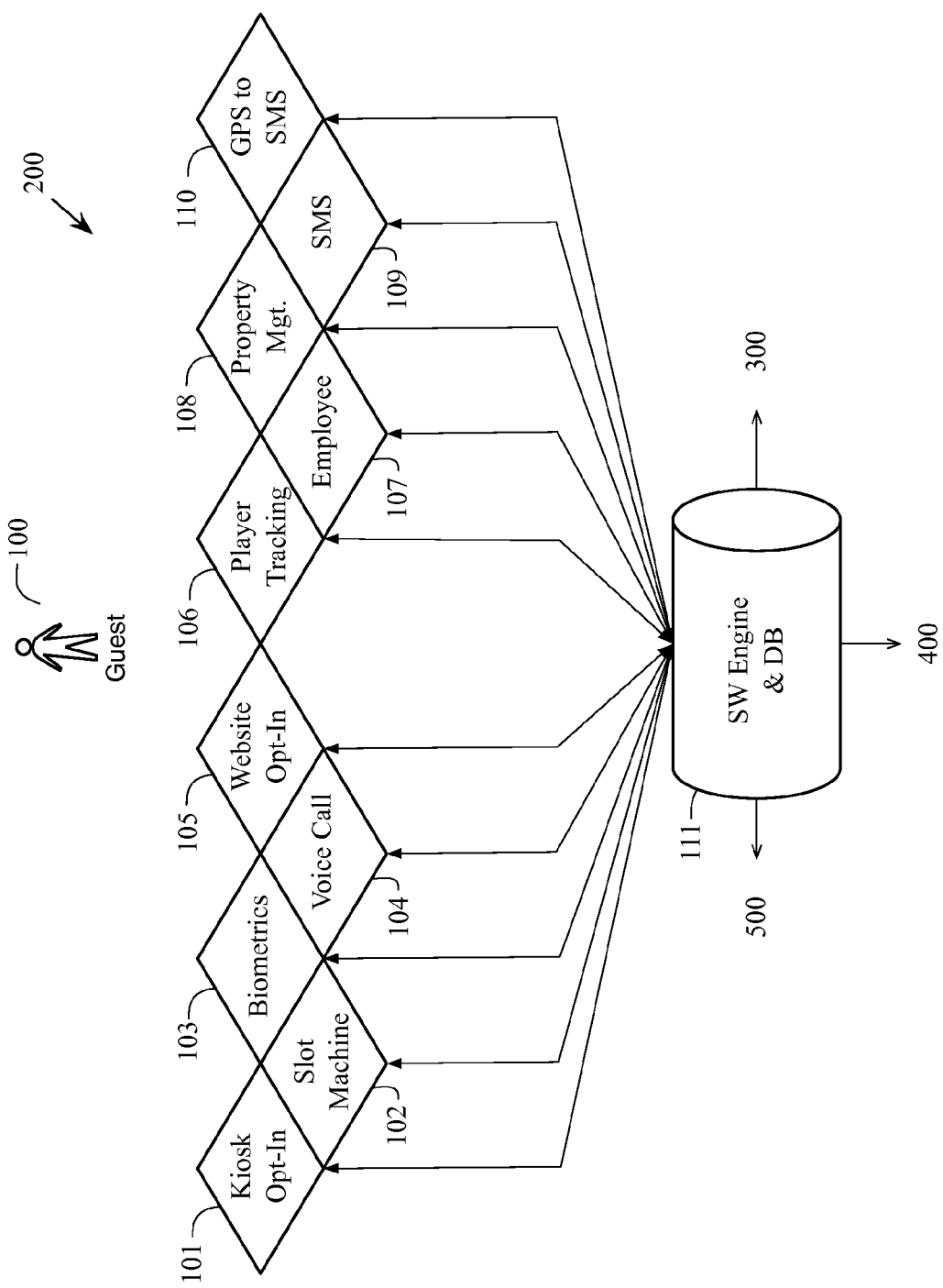
FIG. 2A is an isolated block diagram of the engine and database.

FIG. 2A illustrates various means for interacting with guests of the hospitality entity. The guest 100 preferably interacts with an opt-in kiosk 101 at registration. Alternatively, there is a GUI at a slot machine 102. Biometrics 103 such as facial, finger print, or a retinal scan may be used to opt-in. The guest 100 alternatively uses a voice call 104 from the mobile phone. The guest 100 alternatively uses a web-site 105 on the Internet to opt-in. Alternatively, if the guest 100 is a member of a casino player program then the guest 10 can opt-in through the player tracking program 106. An employee 107 can alternatively upon authorization from the guest, opt-in or opt-out on behalf of the guest. A property management sub-system 108 is also an alternative means for a guest 100 to opt-in or opt-out. The guest 100 alternatively uses a mobile phone to send a SMS message to opt-in or opt out. Finally, the guest alternatively opt-ins or opt-out uses proximity sensors via a global positioning system 110. All of these methods can interact with the software engine and database 111.

Figure 2B:
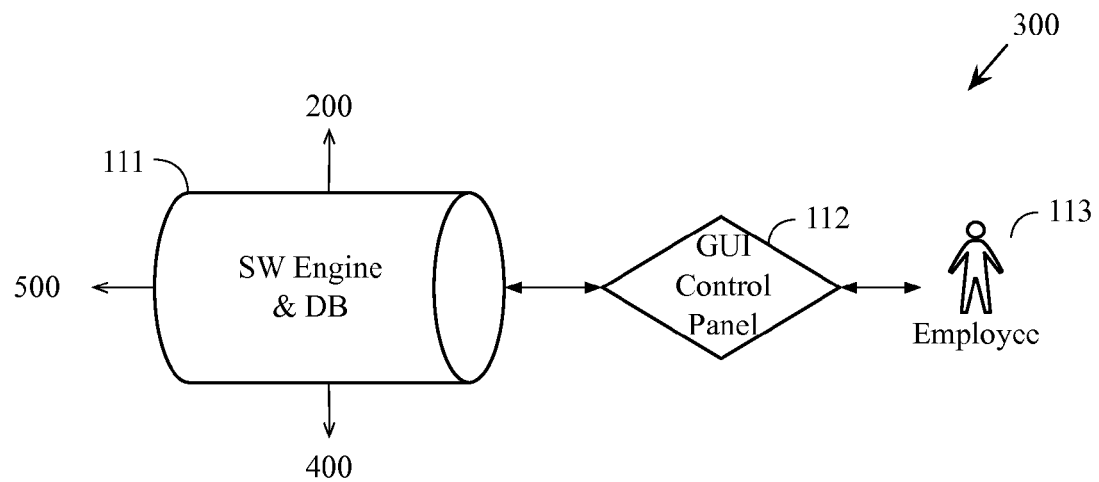
FIG. 2B is an isolated block diagram of the engine, database and user interface.

FIG. 2B illustrates an employee 113 interacting with the GUI 112 to receive or send data to the software engine and database 111.

Figure 2C:
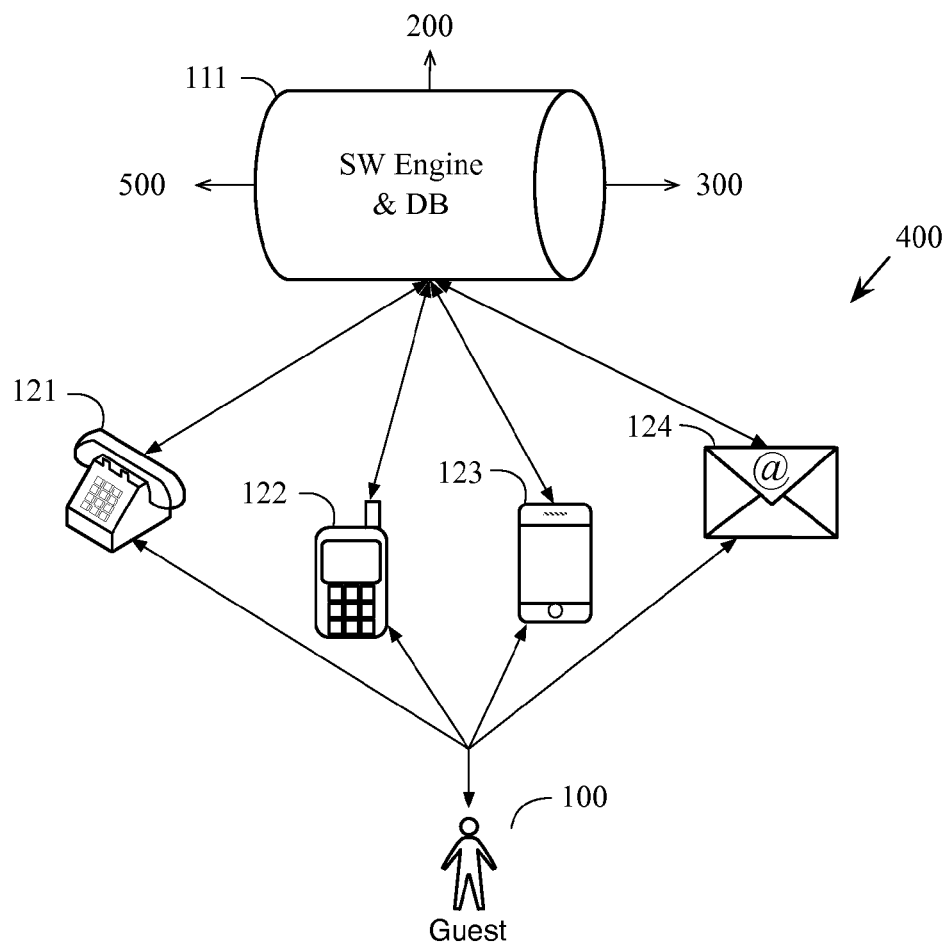
FIG. 2C is an isolated block diagram of the engine, database and user communication devices.
Figure 2D:
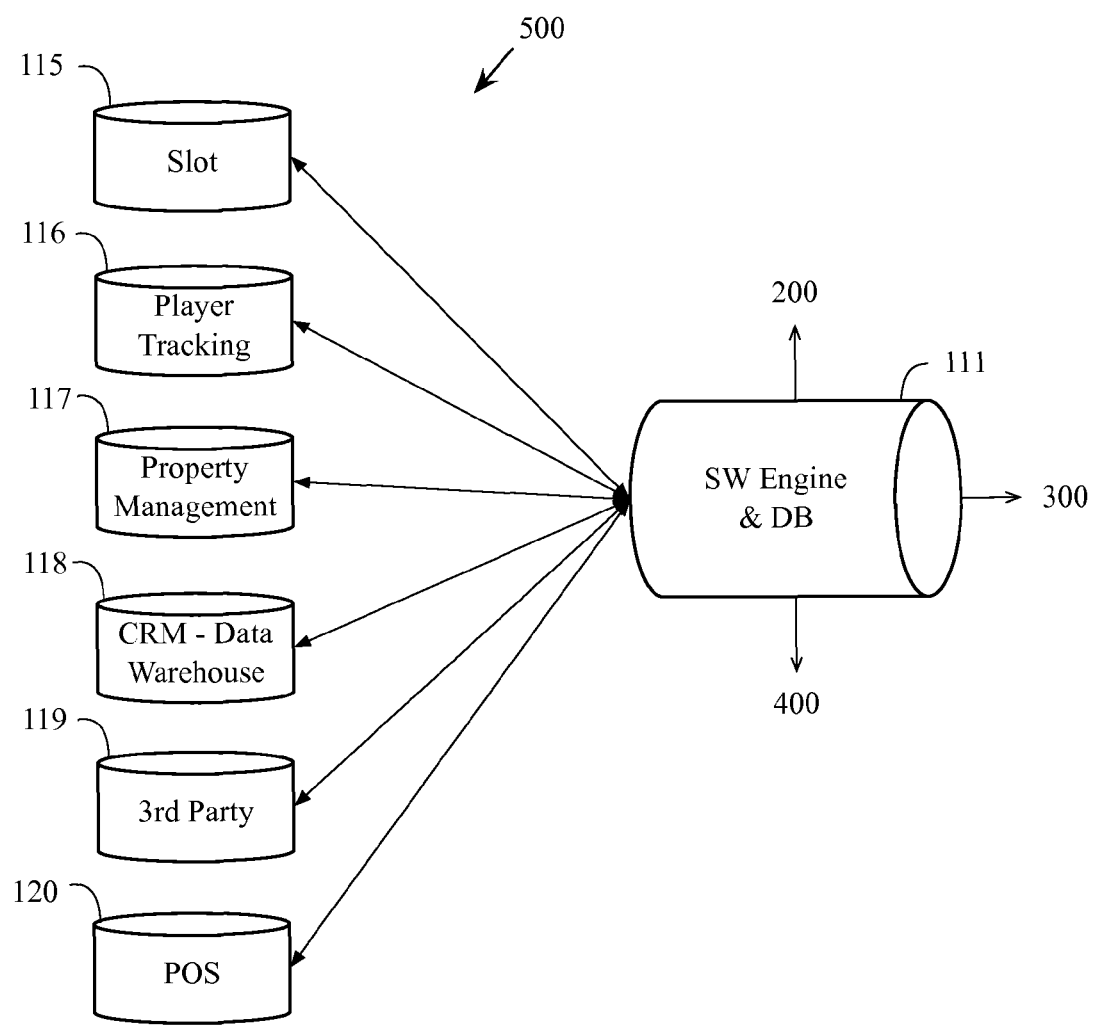
FIG. 2D is an isolated block diagram of the engine and databases.

FIG. 2C illustrates the various communication devices that a guest 100 can use with the system and method of the present invention. The guest can use a landline telephone 121, a smartphone 122, a standard mobile phone 123 and email 124.

The software engine and database 111 interfaces with multiple sub-systems throughout the hospitality entity 500. The software engine and database 111 interacts with the slot system 115, the player tracking system 116, the property management system 117, the CRM data warehouse 118, $3^{rd}$ party database 119 and POS 120. The software engine and database 111 distributes offers to the guest 100 preferably through SMS texts to the mobile phone 123 of the guest 100. The software engine and database 111 stores the historical information for the guests and uses specific algorithms and predictive modeling to determine which type of offer to send to the guest.

Each of the interface descriptions discloses use at least one communication protocol to establish handshaking or bi-directional communications. These protocols include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system include but are not limited to MSSQL, Access, MySQL, Progress, Oracle, DB2, Open Source DBs and others. Operating system used with the system include Microsoft 2010, XP, Vista, 200o Server, 2003 Server, 2008 Server, Windows Mobile, Linux, Android, Unix, I series, AS 400 and Apple OS.

Preferably, the system of the present invention interacts with various types of phones such as mobile, home, office, or others. Such preferred telephonic computing devices include the IPHONE® smartphone from Apple, Inc., BLACKBERRY® smartphones from Research In Motion, the ANDROID® smartphone from Google, Inc., the TRE® smartphone from Palm, Inc., and many more. In one mechanism, supported by most mobile phones, the guest sends the opt-in contact information of the guest in a short code (over MMS/SMS). Most mobile phones support a standard called vCard (.vcf) when sending contact information in a text message.

The underlying protocol at the server 35 is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP") or other similar protocols. The transmission protocol ranges from SIP to MGCP to FTP and beyond. Essentially any protocol is used that is designed for transmission of media files. The protocol at the server is preferably HTTP.

The server transmits a delivery SMS message to the guest with information concerning an offer and the unique identifier code. Preferably, the SMS message is sent using standard SMS protocols used by wireless carriers. Alternatively, an application message is transmitted to the server using normal data protocols such as TCP/IP. The SMS message sent to the sender's mobile phone will preferably have the form [Offer] and [unique identifier].

Figure 6:
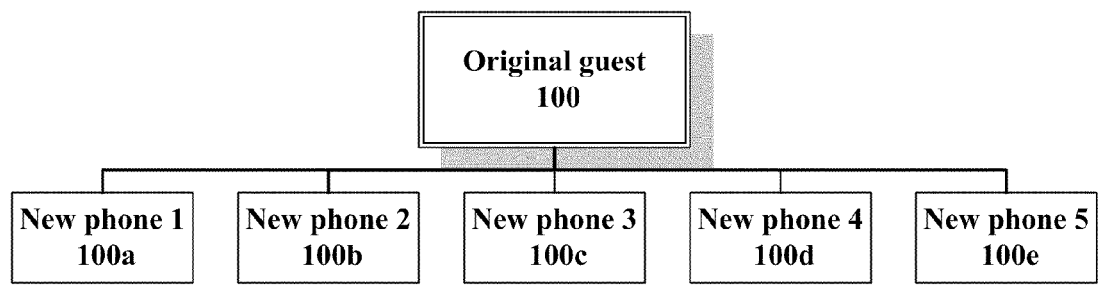
FIG. 6 is a block diagram of an original guest distribution of offers to a predetermined number of other mobile phones.

As shown in FIG. 6, the original guest 100 may be given the opportunity to forward an offer to a predetermined number of other mobile phones 100a-100e. For example, the hospitality entity may want to allow the guest 100 to forward an offer of concert tickets to five other parties and thus the offer will allow the guest to forward the SMS text to five other mobile phone numbers.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for a hospitality entity to communicate goods and services to a guest based on events occurring at a facility of the hospitality entity, the method comprising:

receiving from a guest an opt-in decision to participate in a program of the hospitality entity that offers goods and services to the guest through SMS texts transmitted to a mobile phone of the guest;

associating an unique identifier with the mobile phone of the guest, the unique identifier comprising a plurality of alpha-numeric characters;

recognizing a first event, the first event is checking-in at the facility of the hospitality entity by the guest;

transmitting a first executable offer to the mobile phone through a first SMS text sent to the mobile phone, the first executable offer based on the first event and comprising a discount for at least a good or service provided by the hospitality entity, the first SMS text comprising the unique identifier;

determining that the first executable offer has been accepted by the guest by recognizing the unique identifier prior to conveyance of the good or service of the first executable offer to the guest, the acceptance of the first executable offer representing a second event;

transmitting a second executable offer to the mobile phone through a second SMS text sent to the mobile phone, the second SMS text comprising the unique identifier, the second executable offer transmitted subsequent to a time period associated with the second event, a content of the second executable offer based on at least the acceptance of the first executable offer and [at least one of] a time of day, a current date, [a current local climate,] a current entertainment event, and a current activity of the guest.

2. The method according to claim 1 wherein the first executable offer is a coupon for a discount at a restaurant located on the facility of the hospitality entity.

3. The method according to claim 1 wherein the current entertainment event is a concert being held at the facility of the hospitality entity in the near future and the second executable offer is a free ticket to the concert.

4. The method according to claim 1 further comprising a third event which is a time delay in being seated at a restaurant located on the facility of the hospitality entity, and a third executable offer which is a coupon for a free drink at a bar located in proximity to the restaurant.

* * * * *